(12) United States Patent
Mobin et al.

(10) Patent No.: US 9,740,580 B2
(45) Date of Patent: Aug. 22, 2017

(54) SYSTEMS AND METHODS FOR SERIAL DATA TRANSFER MARGIN INCREASE

(71) Applicant: Avago Technologies General IP (Singapore) Pte. Ltd., Singapore (SG)

(72) Inventors: Mohammad Mobin, Orefield, PA (US); Bruce A. Wilson, San Jose, CA (US); Haitao Xia, San Jose, CA (US)

(73) Assignee: AVAGO TECHNOLOGIES GENERAL IP (SINGAPORE) PTE. LTD. (SG)

( * ) Notice: Subject to any disclaimer, the term of this patent is extended or adjusted under 35 U.S.C. 154(b) by 239 days.

(21) Appl. No.: 14/748,168

(22) Filed: Jun. 23, 2015

(65) Prior Publication Data

US 2016/0378619 A1    Dec. 29, 2016

(51) Int. Cl.
*G06F 11/16* (2006.01)
*G06F 11/07* (2006.01)

(52) U.S. Cl.
CPC ...... *G06F 11/1604* (2013.01); *G06F 11/0757* (2013.01)

(58) Field of Classification Search
CPC ..... H04L 7/0025; H04L 7/033; H04L 7/0331; H04L 7/0004; H04L 7/0008; H04L 7/0037; H04L 7/0054; H04L 7/042; H04B 17/14
USPC ................................. 375/222, 365, 371–376
See application file for complete search history.

(56) References Cited

U.S. PATENT DOCUMENTS

| | | | |
|---|---|---|---|
| 8,422,615 B2 | 4/2013 | Den Besten | |
| 8,442,173 B2 | 5/2013 | Kenny | |
| 8,559,580 B2 | 10/2013 | Dai et al. | |
| 8,571,158 B2 | 10/2013 | Chen et al. | |
| 8,605,847 B2 | 12/2013 | Mobin et al. | |
| 8,861,580 B2 | 10/2014 | Abel et al. | |
| 8,902,964 B2 | 12/2014 | Aguilar-Arreola et al. | |
| 8,995,514 B1 * | 3/2015 | Asuncion | H04B 3/462 375/226 |
| 2005/0147194 A1 * | 7/2005 | Koenenkamp | H03L 7/0814 375/348 |
| 2005/0237086 A1 | 10/2005 | Galloway et al. | |
| 2006/0274874 A1 * | 12/2006 | Kumar | H03L 7/0814 375/362 |
| 2012/0207259 A1 * | 8/2012 | Crain | H03L 7/0807 375/371 |
| 2014/0270030 A1 * | 9/2014 | Hammad | H04L 7/0079 375/371 |
| 2014/0314138 A1 | 10/2014 | Zhong et al. | |

OTHER PUBLICATIONS

U.S. Appl. No. 14/740,371, filed Jun. 16, 2015, Mobin.
Yuan "Design Techniques for Decision Feedback Equalization of Multi-Giga-Bit-Per-Second Serial Data Links: A State-of-The-Art Review" IET Circuits, Devices and Systems Jan. 2013.

* cited by examiner

*Primary Examiner* — Emmanuel Bayard
(74) *Attorney, Agent, or Firm* — Sheridan Ross P.C.

(57) ABSTRACT

Embodiments are related to systems and methods for data processing, and more particularly to systems and methods for enhancing margin in a serial data transfer.

21 Claims, 7 Drawing Sheets

SYSTEMS AND METHODS FOR SERIAL DATA TRANSFER MARGIN INCREASE

FIELD OF THE INVENTION

Embodiments are related to systems and methods for data processing, and more particularly to systems and methods for enhancing margin in a serial data transfer.

BACKGROUND

A number of data transfer systems have been developed. Some transfer systems transfer information in serial. To increase data transfer rates the period between bit periods is decreased. While such reduction in period results in increased transfer rates, in results in a corresponding decrease in sampling window. Decreasing the sampling window increases the probability for data errors due to sampling inaccuracy.

Hence, for at least the aforementioned reasons, there exists a need in the art for advanced systems and methods for enhancing sampling margins.

SUMMARY

Embodiments are related to systems and methods for data processing, and more particularly to systems and methods for enhancing margin in a serial data transfer.

Various embodiments provide serial data processing systems. The systems include a first latch and a second latch. The first latch is operable to repeatedly latch a data input based upon a threshold and a first phase of a clock to yield a first output, and the second latch operable to repeatedly latch the data input based upon the threshold and a second phase of the clock to yield a second output. Repeated sampling and superposition on unit intervals of the data input yields an eye. The system further includes a control circuit operable to: compare corresponding instances of the first output and the second output to yield an error value; detect a transition of the second output corresponding to an edge of the eye; before the transition of the second output is detected, repeatedly modify the second phase of the clock using a first modification step calculated based at least in part on the error value and a high gain; and after the transition of the second output is detected, modify the second phase of the clock using a second modification step calculated based at least in part on the error value and a reduced gain.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
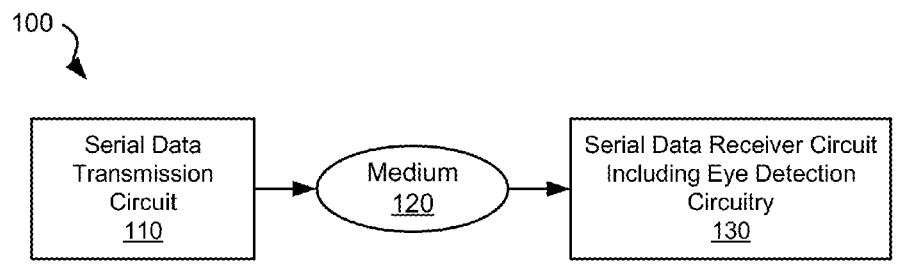
FIG. 1 shows a serial data transfer system including a serial data receiver having eye detection circuitry in accordance with various embodiments of the present inventions.

Embodiments are related to systems and methods for data processing, and more particularly to systems and methods for enhancing margin in a serial data transfer.

Various embodiments provide serial data processing systems. The systems include a first latch and a second latch. The first latch is operable to repeatedly latch a data input based upon a threshold and a first phase of a clock to yield a first output, and the second latch operable to repeatedly latch the data input based upon the threshold and a second phase of the clock to yield a second output. Repeated sampling of the data input yields an eye. The system further includes a control circuit operable to: compare corresponding instances of the first output and the second output to yield an error value; detect a transition of the second output corresponding to an edge of the eye; before the transition of the second output is detected, repeatedly modify the second phase of the clock using a first modification step calculated based at least in part on the error value and a high gain; and after the transition of the second output is detected, modify the second phase of the clock using a second modification step calculated based at least in part on the error value and a reduced gain.

In some instances of the aforementioned embodiments, the control circuit is further operable to: detect one of a group of predefined patterns in the second output; and modifying the second phase of the clock is only done upon detection of one of a group of predefined patterns in the second output. In some such instances, the one of the group of predefined patterns has at least three bits corresponding to symbols in the data input. In particular cases, the predefined patterns include, but are not limited to: '11101' and '00010'. On some cases, the predefined patterns include, but are not limited to: '00110' and '11001'.

In various instances of the aforementioned embodiments, the threshold is variable. In some such instances, the control circuit is further operable to: modify the first phase of the clock based at least in part on the second phase of the clock to yield a modified first phase; repeatedly sample the data input at the modified first phase to yield a maximum voltage and a minimum voltage; and modify the threshold based upon a combination of the maximum voltage and the minimum voltage.

In some instances of the aforementioned embodiments, the serial data processing system is implemented as part of a serial data receiver. In some such cases, the serial receiver is implemented as part of an integrated circuit. In various cases, detecting a transition of the second output corresponding to the edge of the eye is done using the difference between an odd eye and an even eye output of the second latch.

Other embodiments provide serial data processing systems that include a first latch, a second latch and a control circuit. The first latch is operable to repeatedly latch a data input based upon a threshold and a first phase of a clock to yield a first output, and the second latch operable to repeatedly latch the data input based upon the threshold and a second phase of the clock to yield a second output. Repeated sampling of the data input yields an eye. The control circuit is operable to: compare corresponding instances of the first output and the second output to yield an error value; detect one of a group of first transition patterns in the second output corresponding to an edge of the eye, where the first transition pattern is a two bit pattern; before detection of the one of the group of the first transition patterns, repeatedly modify the second phase of the clock using a first modification step calculated based at least in part on the error value; detect one of a group of second transition patterns in the second output corresponding to an edge of the eye, where the second transition pattern is at least a three bit pattern; and after detection of the one of the group of the first transition patterns, modify the second phase of the clock using a second modification step calculated only upon detection of one of the group of second transition patterns.

In some instances of the aforementioned embodiments, the first modification step is calculated based at least in part on a high gain value. In some such instances, the second modification step is calculated based at least in part on a reduced gain value. In various instances of the aforementioned embodiments, the group of first transition patterns includes: '10' and '01', and the group of second transition patterns includes: '11101' and '00010', or '00110' and '11001'.

In various instances of the aforementioned embodiments, the threshold is variable. In some such instances, the control circuit is further operable to: modify the first phase of the clock based at least in part on the second phase of the clock to yield a modified first phase; repeatedly sample the data input at the modified first phase to yield a maximum voltage and a minimum voltage; and modify the threshold based upon a combination of the maximum voltage and the minimum voltage.

In some instances of the aforementioned embodiments, the serial data processing system is implemented as part of a serial data receiver. In some such cases, the serial receiver is implemented as part of an integrated circuit. In various cases, detecting a transition of the second output corresponding to the edge of the eye is done using the difference between an odd eye and an even eye output of the second latch.

Other embodiments of the present invention provide methods for serial data processing. The methods include: receiving a data input that when repeated sampled yields an eye; using a first latch to repeatedly latch the data input based upon a threshold and a first phase of a clock to yield a first output; using a second latch to repeatedly latch the data input based upon the threshold and a second phase of the clock to yield a second output; comparing corresponding instances of the first output and the second output to yield an error value; detecting a transition of the second output corresponding to an edge of the eye; before the transition of the second output is detected, repeatedly modifying the second phase of the clock using a first modification step calculated based at least in part on the error value and a high gain; and after the transition of the second output is detected, modifying the second phase of the clock using a second modification step calculated based at least in part on the error value and a reduced gain.

Yet other embodiments of the present invention provide methods for serial data processing. The methods include: receiving a data input that when repeated sampled yields an eye; using a first latch to repeatedly latch the data input based upon a threshold and a first phase of a clock to yield a first output; using a second latch to repeatedly latch the data input based upon the threshold and a second phase of the clock to yield a second output; comparing corresponding instances of the first output and the second output to yield an error value; detecting one of a group of first transition patterns in the second output corresponding to an edge of the eye, where the first transition pattern is a two bit pattern; before detection of the one of the group of the first transition patterns, repeatedly modifying the second phase of the clock using a first modification step calculated based at least in part on the error value; detecting one of a group of second transition patterns in the second output corresponding to an edge of the eye, where the second transition pattern is at least a three bit pattern; and after detection of the one of the group of the first transition patterns, modifying the second phase of the clock using a second modification step calculated only upon detection of one of the group of second transition patterns.

Turning to FIG. 1, a serial data transfer system 100 is shown that includes a serial data transmission circuit 110 and a serial data receiver circuit 130. Serial data transmission circuit 110 may be any circuit known in the art for generating a stream a serial data to be transferred to serial data receiver circuit 130 via a medium 120. Based upon the disclosure provided herein, one of ordinary skill in the art will recognize a variety of data transmission circuitry that may be used in relation to different embodiments of the present invention. Medium 120 may be, but is not limited to, a wired or wireless transfer medium. Such wired transfer mediums may be a metal wire transfer medium capable of transmitting electrical signal, or may be an optical transfer medium capable of transferring light. Based upon the disclosure provided herein, one of ordinary skill in the art will recognize a variety of wired transfer media that may be used in relation to different embodiments of the present invention. The aforementioned wireless transfer mediums may be an atmosphere capable of transmitting, for example, radio frequency signals. Based upon the disclosure provided herein, one of ordinary skill in the art will recognize a variety of wireless transfer media that may be used in relation to different embodiments of the present invention.

Serial data receiver circuit 130 receives the serial data via medium 120. The received serial data is sampled and the sampled data is provided to one or more circuits (not shown) for processing. As part of receiving the serial data, eye detection circuitry included in serial data receiver circuit 130 identifies a central point within an eye of the serial data. This central point within the eye corresponds to the phase and/or threshold at which the transferred data is sampled. In some embodiments of the present invention, the central point is selected as the location that provides an acceptable immunity from sampling errors.

Figure 2:
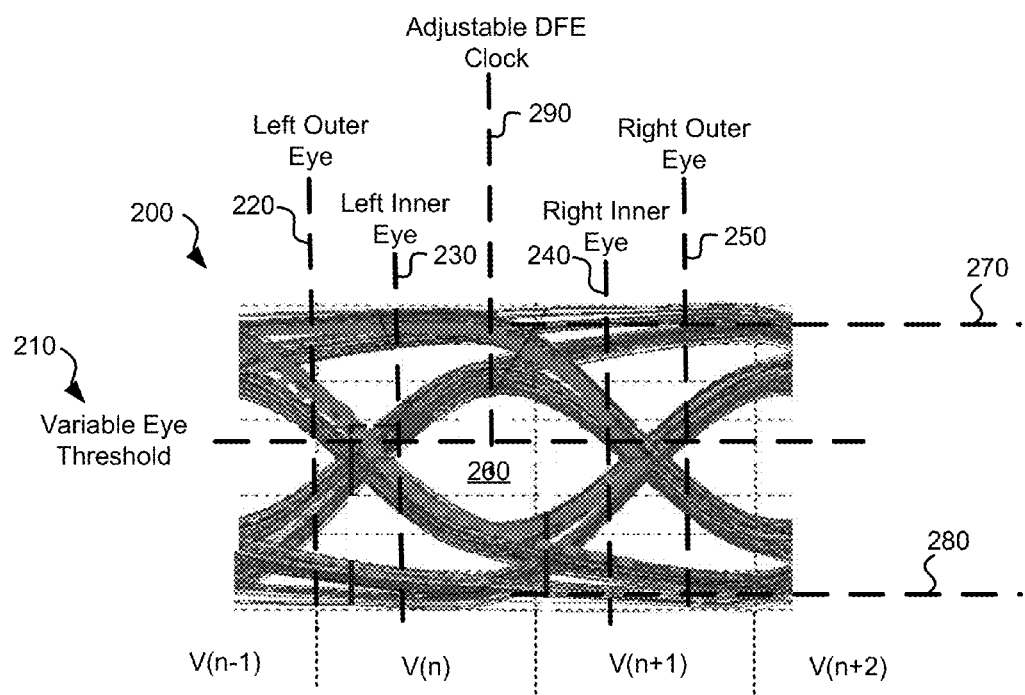
FIG. 2 graphically depicts an example serial data signal eye that may be sampled using systems and/or methods in accordance with different embodiments of the present invention.

Turning to FIG. 2, a graphical depiction 200 of an example serial data signal eye is shown that may be sampled using systems and/or methods in accordance with different embodiments of the present invention. Graphical depiction 200 shows a number of symbol instances (e.g., V(n−1), V(n), V(n+1), V(n+2) separated by dotted lines) of a the serial data superimposed on upon the other. The superimposed symbol instances show a numbed of data transitions from 1->0, 0->1, 1-> and 0->0. These superimposed symbol instances define an eye 260. As eye 260 is defined by the superimposition of a number of symbol instances and therefore there is some distance between an outer edges and inner edges of eye 260. In particular, a left outer edge 220 is offset from a left inner edge 230 at the left side of eye 260; and a right outer edge 250 is offset from a right inner edge 240 at the right side of eye 260. The sampling is done using a threshold (i.e., a variable eye threshold 210) which is varied to be centralized between an upper sample value and a lower sample value at a central sample phase between left inner edge 230 and right inner edge 240. Of note, the threshold identified as variable eye threshold 210 is variable depending upon the change in the location between left inner edge 230 and right inner edge 240.

Figure 3:
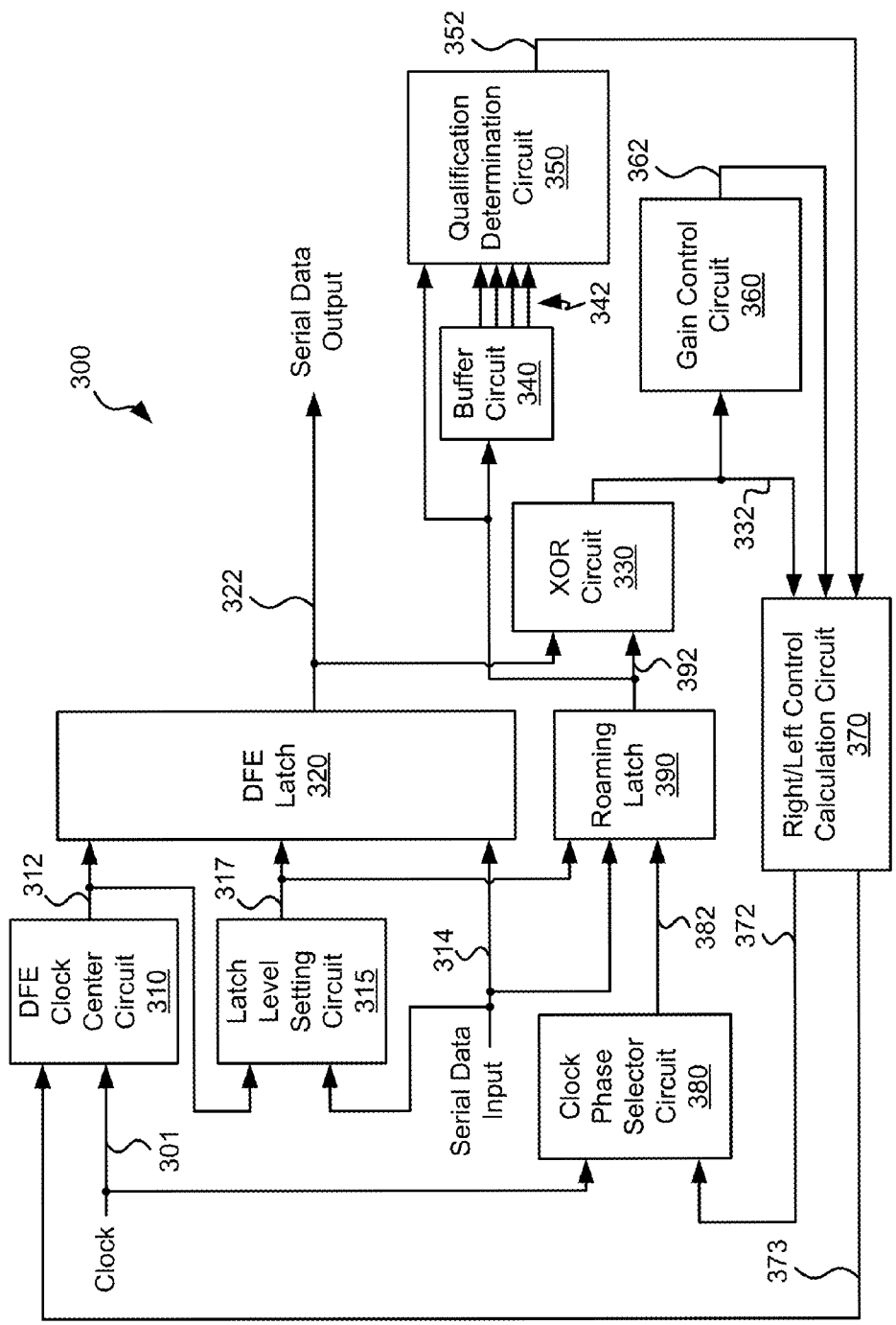
FIG. 3 depicts an eye detection circuit in accordance with various embodiments of the present invention.

Turning to FIG. 3, an eye detection circuit 300 is shown in accordance with various embodiments of the present invention. Eye detection circuit 300 includes a Decision Feedback Equalizer (DFE) latch 320 and a roaming latch 390. In some cases, DFE latch 320 and roaming latch 390 are identical circuits. DFE latch 320 latches a serial data input 314 as a serial data output 322 based upon a comparison with a variable threshold 317 whenever a DFE clock 312 is asserted. A DFE clock center circuit 310 operates to select a phase of a clock 301 based upon a DFE phase selector 373. Roaming latch 390 latches serial data input 314 as a roaming output 392 based upon a comparison with variable threshold 317 whenever a roaming clock 382 is asserted. A clock phase selector circuit 380 operates to select a phase of a clock 301 based upon a roaming phase selector 372. A latch level setting circuit 315 operates to set variable threshold 317 based upon samples of serial data input 314 synchronous to DFE clock 312.

An XOR circuit 330 XORs serial data output 322 with roaming output 392 to yield an error output 332 that is provided to a right/left control circuit 370, and a gain control circuit 360. A buffer circuit 340 buffers a number of instances of roaming output 392 corresponding to different symbol periods. A plurality of instances of roaming output 392 (e.g., V(n−3), V(n−2), V(n−1), V(n)) are provided as a parallel output 342 to a qualification determination circuit 350. Qualification determination circuit 350 provides a qualification output 352 to right/left control circuit 370. Gain control circuit 360 provides a gain value 362 to right/left control circuit 370. Right/left control circuit 370 provides both roaming phase selector 372 and DFE phase selector 373.

In operation, right/left control circuit 370 initializes roaming phase selector 372 and DFE phase selector 373 such that DFE clock 312 is near an expected central location (e.g., adjustable DFE clock 290) of an eye, and roaming clock 382 is left of an expected location of an outer edge (e.g., left outer eye 220) of the eye. In addition, gain control circuit 360 initializes gain value 362 as a high value. In some cases, the "high value" of the gain value is user programmable as is the initial roaming clock. In other cases, the "high value" of the gain value and the initial roaming clock are fixed.

Serial data input 314 is received and latched by roaming latch 390 synchronous to roaming clock 382 yield roaming output 392, and is latched by DFE latch 320 synchronous to DFE clock 312 to yield serial data output 322. Serial data output 322 and roaming output 392 are provided to XOR circuit 330 where they are XORed to yield error output 332. Where Serial data output 322 is different from roaming output 392, error output 332 ($R_{err}$) is a one. Otherwise error output 332 ($R_{err}$) is a zero. Where error output 332 is a one, it suggests that roaming clock 392 has not made it to the right of the left inner edge (e.g., left inner eye 230) of the eye. Where error output 332 is a one, the search direction is still moving from left to right looking for the inner edge of the eye. In the left to right direction, the high value of the gain value makes the steps in the search relatively large. In contrast, where error output 332 is a zero, it suggests that the roaming clock has made it to the right of the left inner edge (e.g., left inner eye 230) of the eye. In this condition, the search direction is reversed and begins to move from right to left looking for the inner edge of the eye. In the right to left direction, gain control circuit 360 changes gain value 362 from the high value to a reduced value which makes the steps in the search relatively small compared with the steps allowable when the high value of the gain value is used. As used herein, the phrase "reduced value" is used in its broadest sense to mean a value that is less than a "high value", and correspondingly the phrase "high value" is used in its broadest sense to mean a value that is greater than the "reduced value". Based upon the disclosure provided herein, one of ordinary skill in the art will recognize values that may be used for the high value and the low value of the gain in accordance with different embodiments of the present invention.

In parallel, qualification determination circuit 350 compares the current roaming output (roaming output 392 for V(n)) with a preceding roaming output (roaming output 392 for V(n−1)) from buffer circuit 340. Where it is determined that the current roaming output is not different from the preceding roaming output, qualification determination circuit 350 asserts qualification output 352 as a zero. This indicates a transition from either 1->1 or 0->0. Otherwise, where it is determined that the preceding roaming output is different from the current roaming output, qualification determination circuit 350 asserts qualification output 352 as a one. This indicates a transition from either 1->0 or 0->1.

Where error output 332 is a one and qualification output 352 is a one, a left direction value is updated by right/left control circuit 370. The update is done in accordance with the following equation:

$$R_L(n+1)=R_L(n)+\mu(2*R_{err}(n)-1),$$

where $R_L(n+1)$ is the updated left direction value, $R_L(n)$ is the current left direction value, $\mu$ is gain value 362, and $R_{err}(n)$ is error output 332. Otherwise, where qualification output 352 is zero and error output 332 is one, the left direction value is not updated (i.e., $R_L(n+1)=R_L(n)$). In either case, right/left control circuit 370 provides the left direction value $R_L(n+1)$ to clock phase selector circuit 380 as roaming phase selector 372. Clock phase selector circuit 380 modifies the phase of roaming clock 382 to reflect the received left direction value. The steps of sampling and processing are repeated using modified roaming clock 382.

Where error output 332 is zero, coarse tuning is completed and fine tuning begins. Fine tuning involves using qualification determination circuit 350 to compare instances of roaming output 392 stored in buffer circuit 340 from a defined number of symbols (i.e., V(n−3), V(n−2), V(n−1), V(n), V(n+1))(shown as outputs 342) with two different predefined patterns—'11101' and '00010'. Where it is determined that the instance of roaming output 392 from the defined number of symbols are equal to either of the aforementioned patterns, qualification determination circuit 350 asserts qualification output 352 as a one. Otherwise, where it is determined that the roaming values from the defined number of symbols does not equal either of the aforementioned patterns, qualification determination circuit 350 asserts qualification output 352 as a zero.

Where the qualification output 352 is one, the left direction value is updated using the reduced gain value 362. The update is done by right/left control calculation circuit in accordance with the following equation:

$$R_L(n+1)=R_L(n)+\mu(2*R_{err}(n)-1),$$

again where $R_L(n+1)$ is the updated left direction value, $R_L(n)$ is the current left direction value, $\mu$ is gain value 362, and $R_{err}(n)$ is current error output 332. Clock phase selector circuit 380 modifies the phase of roaming clock 382 to reflect the left direction value received as roaming phase selector 372. The steps of sampling and processing are repeated using modified roaming clock 382.

As the sampling continues, serial data input 314 is received and latched by roaming latch 390 synchronous to roaming clock 382 to yield roaming output 392, and is latched by DFE latch 320 synchronous to DFE clock 312 to yield serial data output 322. Roaming output 392 is compared with the current serial data output 322 to determine whether they are different. Where the two outputs are not different (indicating the roaming value is from the right of the left edge of the eye), error output 332 continues at a logic '0'. Alternatively, where the two error values are different (roaming output 392 is moving to the left of the left edge of the eye), the fine tuning has completed and the phase of the current roaming clock is stored as a left phase by right/left control calculation circuit 370. At this juncture, the inner left edge of the eye has been defined and the process transitions to right edge detection.

In detecting the right side of the eye, right/left control circuit 370 re-initializes roaming phase selector 372 such that DFE clock 312 is right of an expected location of an outer edge (e.g., right outer eye 250) of the eye. In addition, gain control circuit 360 initializes gain value 362 as a high value. Serial data input 314 is received and latched by roaming latch 390 synchronous to roaming clock 382 yield roaming output 392, and is latched by DFE latch 320 synchronous to DFE clock 312 to yield serial data output 322. Serial data output 322 and roaming output 392 are provided to XOR circuit 330 where they are XORed to yield error output 332. Where Serial data output 322 is different from roaming output 392, error output 332 ($R_{err}$) is a one. Otherwise error output 332 ($R_{err}$) is a zero. Where error output 332 is a one, it suggests that roaming clock 392 has not made it to the left of the right inner edge (e.g., right inner eye 240) of the eye. Where error output 332 is a one, the search direction is still moving from right to left looking for the inner edge of the eye. In the right to left direction, the high value of the gain value makes the steps in the search relatively large. In contrast, where error output 332 is a zero, it suggests that the roaming clock has made it to the left of the right inner edge (e.g., right inner eye 240) of the eye. In this condition, the search direction is reversed and begins to move from left to right looking for the inner edge of the eye. In the left to right direction, gain control circuit 360 changes gain value 362 from the high value to a reduced value which makes the steps in the search relatively small compared with the steps allowable when the high value of the gain value is used.

In parallel, qualification determination circuit 350 compares the current roaming output (roaming output 392 for V(n)) with a preceding roaming output (roaming output 392 for V(n−1)) from buffer circuit 340. Where it is determined that the current roaming output is not different from the preceding roaming output, qualification determination circuit 350 asserts qualification output 352 as a zero. This indicates a transition from either 1->1 or 0->0. Otherwise, where it is determined that the preceding roaming output is different from the current roaming output, qualification determination circuit 350 asserts qualification output 352 as a one. This indicates a transition from either 1->0 or 0->1.

Where error output 332 is a one and qualification output 352 is a one, a right direction value is updated by right/left control circuit 370. The update is done in accordance with the following equation:

$$R_R(n+1)=R_R(n)+\mu(1-2*R_{err}(n)),$$

where $R_R(n+1)$ is the updated right direction value, $R_R(n)$ is the current right direction value, $\mu$ is gain value 362, and $R_{err}(n)$ is error output 332. Otherwise, where qualification output 352 is zero and error output 332 is one, the left direction value is not updated (i.e., $R_R(n+1)=R_R(n)$). In either case, right/left control circuit 370 provides the right direction value $R_R(n+1)$ to clock phase selector circuit 380 as roaming phase selector 372. Clock phase selector circuit 380 modifies the phase of roaming clock 382 to reflect the received right direction value. The steps of sampling and processing are repeated using modified roaming clock 382.

Where error output 332 is zero, coarse tuning is completed and fine tuning begins. Fine tuning involves using qualification determination circuit 350 to compare instances of roaming output 392 stored in buffer circuit 340 from a defined number of symbols (i.e., V(n−3), V(n−2), V(n−1), V(n), V(n+1))(shown as outputs 342) with two different predefined patterns—'00110' and '11001'. Where it is determined that the instance of roaming output 392 from the defined number of symbols are equal to either of the aforementioned patterns, qualification determination circuit 350 asserts qualification output 352 as a one. Otherwise, where it is determined that the roaming values from the defined number of symbols does not equal either of the aforementioned patterns, qualification determination circuit 350 asserts qualification output 352 as a zero.

Where the qualification output 352 is one, the right direction value is updated using the reduced gain value 362. The update is done by right/left control calculation circuit in accordance with the following equation:

$$R_R(n+1)=R_R(n)+\mu(1-2*R_{err}(n)),$$

again where $R_R(n+1)$ is the updated right direction value, $R_R(n)$ is the current right direction value, $\mu$ is gain value 362, and $R_{err}(n)$ is current error output 332. Clock phase selector circuit 380 modifies the phase of roaming clock 382 to reflect the right direction value received as roaming phase selector 372. The steps of sampling and processing are repeated using modified roaming clock 382.

As the sampling continues, serial data input 314 is received and latched by roaming latch 390 synchronous to roaming clock 382 to yield roaming output 392, and is latched by DFE latch 320 synchronous to DFE clock 312 to yield serial data output 322. Roaming output 392 is compared with the current serial data output 322 to determine whether they are different. Where the two outputs are not different (indicating the roaming value is from the left of the right inner edge of the eye), error output 332 continues at a logic '0'. Alternatively, where the two error values are different (roaming output 392 is moving to the right of the left inner edge of the eye), the fine tuning has completed and the phase of the current roaming clock is stored as a right phase by right/left control calculation circuit 370. At this juncture, the inner right edge of the eye has been defined and the process transitions to a threshold search.

The threshold search includes right/left control calculation circuit 370 calculating a median phase offset previously determined right phase and left phase, and providing the median phase offset to DFE clock center circuit 310 as DFE phase selector 373. Using the clock phase generated based upon the median phase, latch level setting circuit 315 samples serial data output 314 to determine the maximum and minimum values sampled at this phase. Latch level setting circuit 315 then calculates a median voltage between the maximum value and the minimum value. This may be done, for example, by adding the maximum value to the minimum value and dividing by two. This median voltage is provided as variable threshold 317 to both DFE latch 320 and roaming latch 390.

Figure 4A:
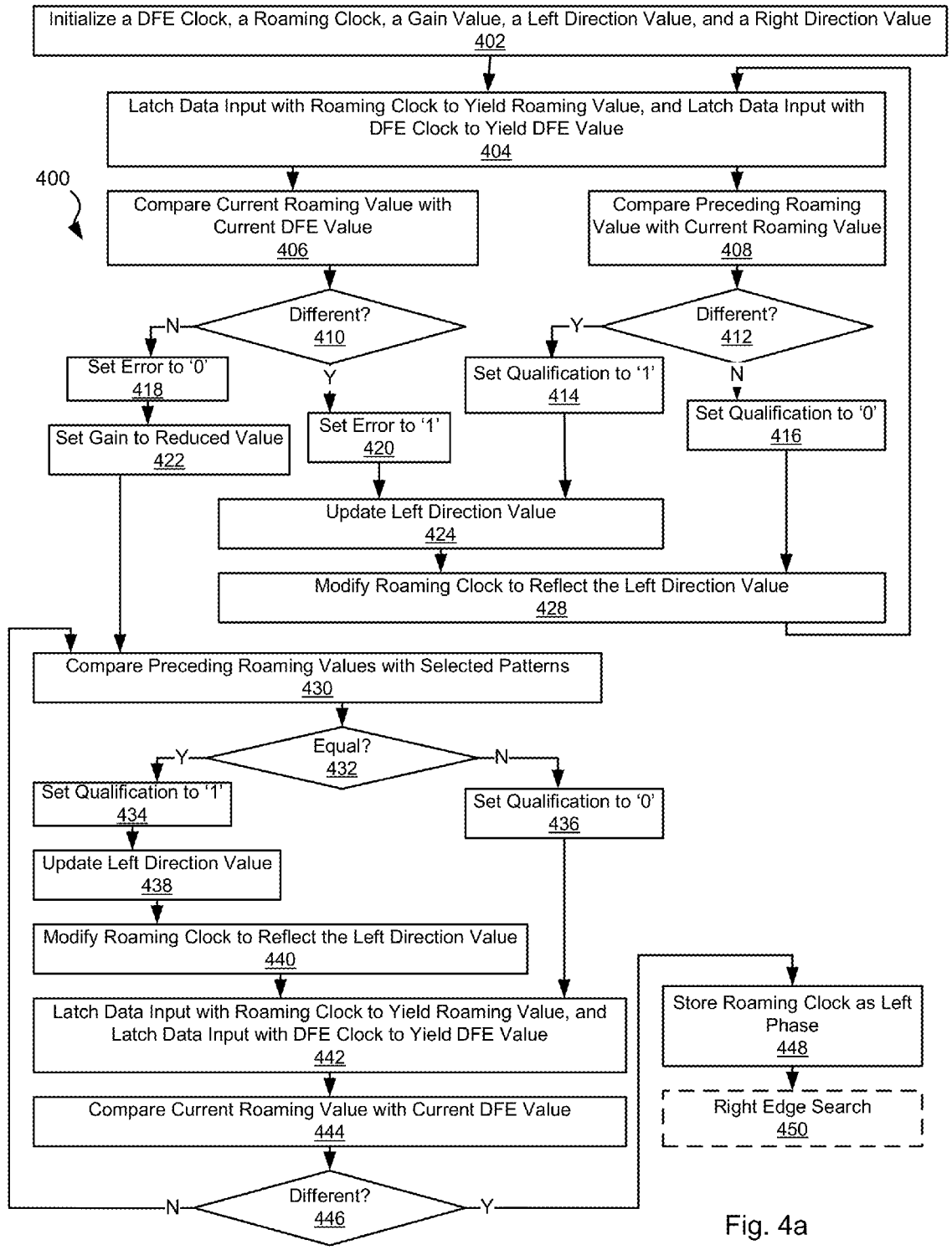
FIGS. 4a-4c are flow diagrams showing a method for eye detection in accordance with one or more embodiments of the present invention.
Figure 4B:
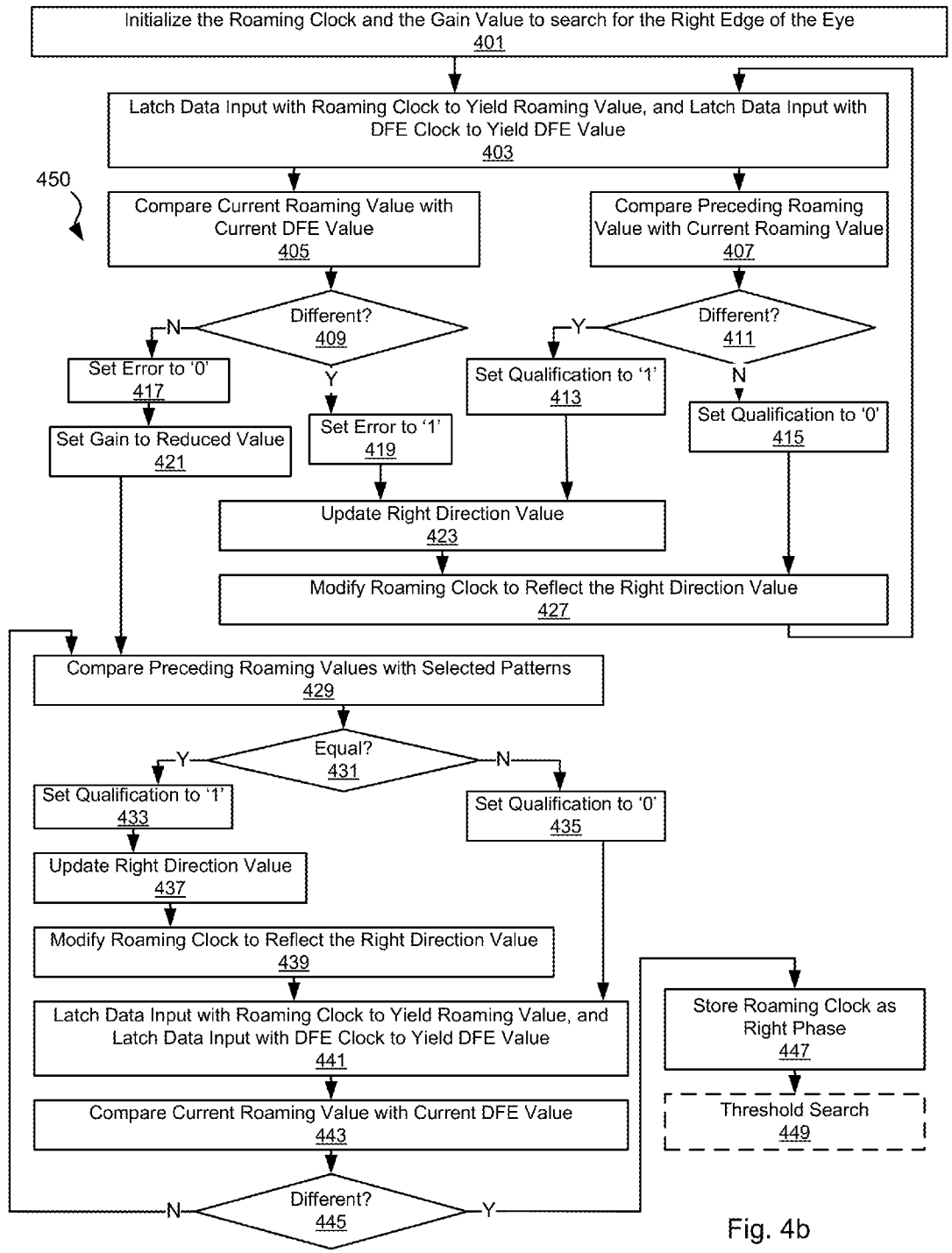
Figure 4C:
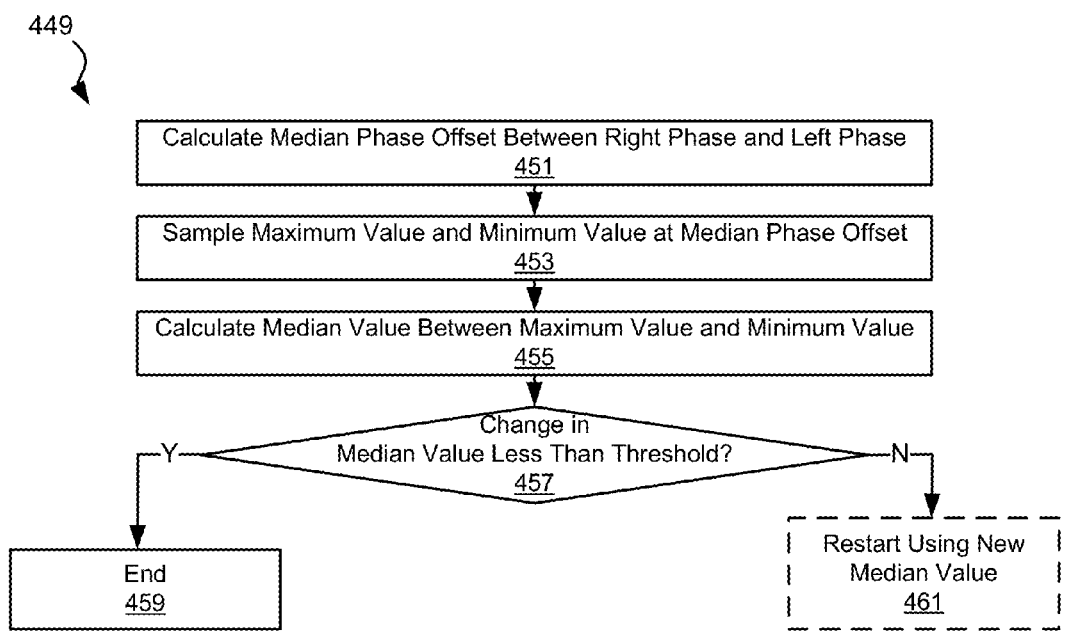

Turning to FIGS. 4a-4c, flow diagrams 400, 401, 449 show a method for eye detection in accordance with one or more embodiments of the present invention. Turning specifically to FIG. 4a and following flow diagram 400, a DFE clock, a roaming clock, a gain value, a left direction value and a right direction value are initialized (block 402). The DFE clock and the roaming clock may be different phases of the same clock frequency. The DFE clock is initialized to be near an expected central location (e.g., adjustable DFE clock 290) of an eye, and the roaming clock is initialized to be left of an expected location of an outer edge (e.g., left outer eye 220) of the eye. The gain value is set to a high value, and the left direction value and right direction value are set to user selectable default values. In some cases, the "high value" of the gain value is user programmable as is the initial roaming clock. In other cases, the "high value" of the gain value and the initial roaming clock are fixed.

A data input is received and latched with the roaming clock using a roaming latch to yield a roaming value, and is latched by the DFE clock using a DFE latch to yield a DFE value (block 404). The roaming value is compared with the current DFE value (block 406), and it is determined whether the current roaming value is different from the current DFE value (block 410). Where the two values are different (block 410), an error ($R_{err}$) is set equal to a logic '1' (block 420). In some cases, the error value is calculated by XORing the DFE value with the roaming value. This condition suggests that the roaming clock has not made it to the right of the left inner edge (e.g., left inner eye 230) of the eye. Where such a condition exists, the search direction is still moving from left to right looking for the inner edge of the eye. In the left to right direction, the high value of the gain value makes the steps in the search relatively large.

Alternatively, where the current roaming value and current DFE value are not different (block 410), an error is set equal to a logic '0' (block 418). This condition suggests that the roaming clock has made it to the right of the left inner edge (e.g., left inner eye 230) of the eye. In this condition, the search direction is reversed and begins to move from right to left looking for the inner edge of the eye. In the right to left direction, the gain value is changed from the high value to a reduced value which makes the steps in the search relatively small compared with the steps allowable when the high value of the gain value is used (block 422). Based upon the disclosure provided herein, one of ordinary skill in the art will recognize values that may be used for the high value and the low value of the gain in accordance with different embodiments of the present invention.

In parallel, the current roaming value is compared with a preceding roaming value (block 408). Where it is determined that the current roaming value is not different from the preceding roaming value (block 408), a qualification value is set equal to zero (block 416). This indicates a transition from either 1->1 or 0->0. Otherwise, where it is determined that the receding roaming value is different from the current roaming value (block 408), a qualification value is set equal to one (block 414). This indicates a transition from either 1->0 or 0->1.

Where the error is set equal to one (block 420) and the qualification is set equal to one (block 414), the left direction value is updated (block 424). The update is done in accordance with the following equation:

$$R_L(n+1)=R_L(n)+\mu(2*R_{err}(n)-1),$$

where $R_L(n+1)$ is the updated left direction value, $R_L(n)$ is the current left direction value, $\mu$ is the gain value, and $R_{err}(n)$ is the current error set in blocks 418, 420. Otherwise, where the qualification value is set equal to zero (block 416) and the error value is set equal to one (block 420), the left direction value is not updated (i.e., $R_L(n+1)=R_L(n)$). In either case, the phase of the roaming clock is modified to reflect the updated left direction value (i.e., $R_L(n+1)$)(block 428), and the processes of blocks 404-428 are repeated using the modified roaming clock.

Where the error is set equal to zero (block 418), coarse tuning is completed and fine tuning begins. Fine tuning involves comparing roaming values from a defined number of symbols (i.e., V(n−3), V(n−2), V(n−1), V(n), V(n+1)) are compared with two different predefined patterns—'11101' and '00010'. Where it is determined that the roaming values from the defined number of symbols are equal to either of the aforementioned patterns, the qualification value is set equal to one (block 434). Otherwise, where it is determined that the roaming values from the defined number of symbols does not equal either of the aforementioned patterns (block 432), the qualification value is set equal to zero (block 436).

Where the qualification value is set equal to one (block 434), the left direction value is updated using the reduced gain value (block 438). The update is done in accordance with the following equation:

$$R_L(n+1)=R_L(n)+\mu(2*R_{err}(n)-1),$$

again where $R_L(n+1)$ is the updated left direction value, $R_L(n)$ is the current left direction value, $\mu$ is the gain value, and $R_{err}(n)$ is the current error set in blocks 418, 420.

The phase of the roaming clock is modified to reflect the updated left direction value (i.e., $R_L(n+1)$)(block 440), and the data input is received and latched with the roaming clock using a roaming latch to yield a roaming value, and is latched by the DFE clock using a DFE latch to yield a DFE value (block 442). The roaming value is compared with the current DFE value (block 444), and it is determined whether the current roaming value is different from the current DFE value (block 446). Where the two values are not different (indicating the roaming value is from the right of the left edge of the eye) (block 446), the error ($R_{err}$) is maintained at a logic '0' and the processes of blocks 430-446 are repeated. Alternatively, where the two error values are different (the roaming value is moving to the left of the left edge of the eye), the fine tuning has completed and the phase of the current roaming clock is stored as a left phase (block 448). At this juncture, the inner left edge of the eye has been defined and the process transitions to right edge detection (block 450). Details of block 450 are more fully discussed in relation to FIG. 4b.

Turning to FIG. 4b and following flow diagram 450, the roaming clock and the gain value are initialize to search for the right edge of the eye (block 401). This includes initializing the roaming clock to be right of an expected location of an outer edge (e.g., right outer eye 250) of the eye. A data input is received and latched with the roaming clock using a roaming latch to yield a roaming value, and is latched by the DFE clock using a DFE latch to yield a DFE value (block 403). The roaming value is compared with the current DFE value (block 405), and it is determined whether the current roaming value is different from the current DFE value (block 409). Where the two values are different (block 409), an error ($R_{err}$) is set equal to a logic '1' (block 419). In some cases, the error value is calculated by XORing the DFE value with the roaming value. This condition suggests that the roaming clock has not made it to the left of the right inner edge (e.g., right inner eye 240) of the eye. Where such a condition exists, the search direction is still moving from right to left looking for the inner edge of the eye. In the right to left direction, the high value of the gain value makes the steps in the search relatively large.

Alternatively, where the current roaming value and current DFE value are not different (block 410), an error is set equal to a logic '0' (block 417). This condition suggests that the roaming clock has made it to the left of the right inner edge (e.g., right inner eye 240) of the eye. In this condition, the search direction is reversed and begins to move from left to right looking for the inner edge of the eye. In the left to right direction, the gain value is changed from the high value to a reduced value which makes the steps in the search relatively small compared with the steps allowable when the high value of the gain value is used (block 421).

In parallel, the current roaming value is compared with a preceding roaming value (block 407). Where it is determined that the current roaming value is not different from the preceding roaming value (block 407), a qualification value is set equal to zero (block 415). This indicates a transition from either 1->1 or 0->0. Otherwise, where it is determined that the DFE value is different from the current roaming value (block 407), a qualification value is set equal to one (block 413). This indicates a transition from either 1->0 or 0->1.

Where the error is set equal to one (block 419) and the qualification is set equal to one (block 413), the right direction value is updated (block 424). The update is done in accordance with the following equation:

$$R_R(n+1)=R_R(n)+\mu(1-2*R_{err}(n)),$$

where $R_R(n+1)$ is the updated right direction value, $R_R(n)$ is the current right direction value, $\mu$ is the gain value, and $R_{err}(n)$ is the current error set in blocks 417, 419. Otherwise, where the qualification value is set equal to zero (block 415) and the error value is set equal to one (block 419), the left direction value is not updated (i.e., $R_R(n+1)=R_R(n)$). In either case, the phase of the roaming clock is modified to reflect the updated left direction value (i.e., $R_L(n+1)$)(block 427), and the processes of blocks 403-427 are repeated using the modified roaming clock.

Where the error is set equal to zero (block 418), coarse tuning is completed and fine tuning begins. Fine tuning involves comparing roaming values from a defined number of symbols (i.e., V(n−3), V(n−2), V(n−1), V(n), V(n+1)) are compared with two different predefined patterns—'00110' and '11001' (block 430). Where it is determined that the roaming values from the defined number of symbols are equal to either of the aforementioned patterns (block 432), the qualification value is set equal to one (block 434). Otherwise, where it is determined that the roaming values from the defined number of symbols does not equal either of the aforementioned patterns (block 432), the qualification value is set equal to zero (block 436).

Where the qualification value is set equal to one (block 433), the right direction value is updated using the reduced gain value (block 437). The update is done in accordance with the following equation:

$$R_R(n+1)=R_R(n)+\mu(1-2*R_{err}(n)),$$

again where $R_R(n+1)$ is the updated right direction value, $R_R(n)$ is the current right direction value, $\mu$ is the gain value, and $R_{err}(n)$ is the current error set in blocks 417, 419.

The phase of the roaming clock is modified to reflect the updated left direction value (i.e., $R_L(n+1)$)(block 439), and the data input is received and latched with the roaming clock using a roaming latch to yield a roaming value, and is latched by the DFE clock using a DFE latch to yield a DFE value (block 441). The roaming value is compared with the current DFE value (block 443), and it is determined whether the current roaming value is different from the current DFE value (block 446). Where the two values are not different (indicating the roaming value is from the left of the right edge of the eye) (block 445), the error ($R_{err}$) is maintained at a logic '0' and the processes of blocks 429-445 are repeated. Alternatively, where the two error values are different (the roaming value is moving to the right of the right edge of the eye), the fine tuning has completed and the phase of the current roaming clock is stored as a left phase (block 447). At this juncture, the inner right edge of the eye has been defined and the process transitions to threshold search (block 449). Details of block 449 are more fully discussed in relation to FIG. 4c.

Turning to FIG. 4c and following flow diagram 449, a median phase offset between the right phase and the left phase is calculated (block 451). This may be done, for example, by adding the left phase to the right phase and dividing by two. The DFE clock is changed to this median phase offset and the maximum and minimum values of the data input are determined by sampling at the median phase offset (block 453). A median voltage between the maximum value and the minimum value is calculated (block 455). This may be done, for example, by adding the maximum value to the minimum value and dividing by two. This median voltage is used as the latch threshold for the DFE latch and the roaming latch. It is determined whether the change in the median voltage was less than a threshold value (block 457). Where it is less than the threshold, the process ends (block 459) and the determined median voltage is used as the threshold for the DFE latch during subsequent data processing. In some cases, such a condition corresponds to a location of the DFE clock with approximately equal phase margin between left inner eye 230 and right inner eye 240, and a variable eye threshold 210 with equal voltage margin between and upper range 270 of eye 260 and lower range 280 of eye 260. Otherwise, where it is not less than the threshold (block 457), the calibration process begins anew at block 404 of FIG. 4a using the newly established threshold values for the DFE latch and the roaming latch.

Figure 5:
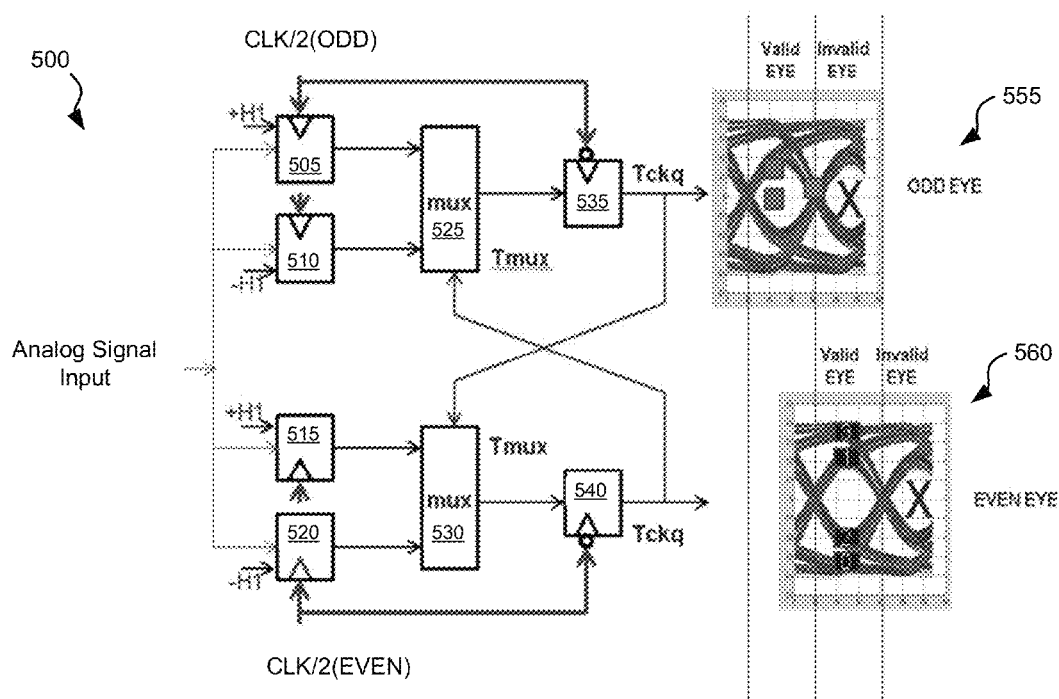
FIG. 5 shows a DFE latch that may be used in relation to one or more embodiments of the present invention.

Turning to FIG. 5, a DFE latch 500 that may be used in relation to one or more embodiments of the present invention is depicted. As shown, DFE latch 500 includes an odd register 535 and an even register 540. Odd register 535 stores an output of a multiplexer 525 synchronous to a falling edge of an odd clock (CLK/2(ODD)), and even register 540 stores an output of a multiplexer 530 synchronous to a falling edge of an even clock (CLK/2(EVEN)). Multiplexer 525 selects the output of one of two latches 505, 510 based upon the output of even register 540, and Multiplexer 530 selects the output of one of two latches 515, 520 based upon the output of odd register 535. Latches 505, 510, 515, 520 that latch an analog input signal synchronous to an odd clock (CLK/2(ODD)) or an even clock (CLK/2(EVEN)). The output of odd register 535 yields an odd eye 555, and the output of even register 540 yields an even eye 560.

Figure 6A:
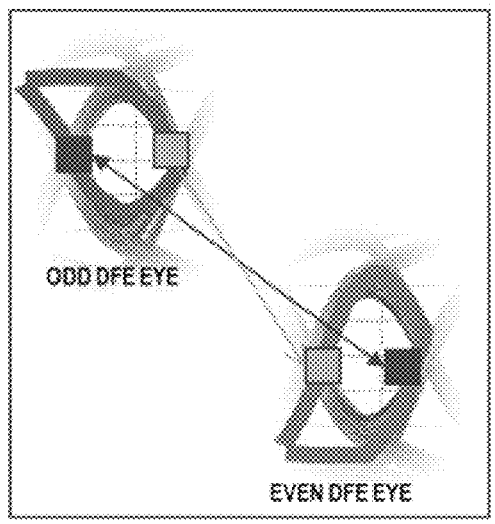
FIGS. 6a-6d graphically illustrates a method for coarse and fine adaptation using the DFE latch of FIG. 5.
Figure 6B:
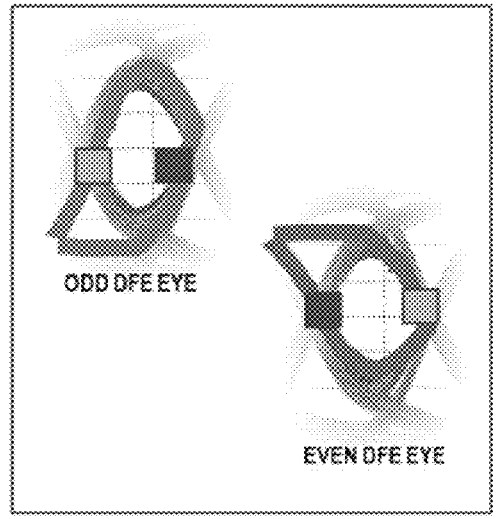
Figure 6C:
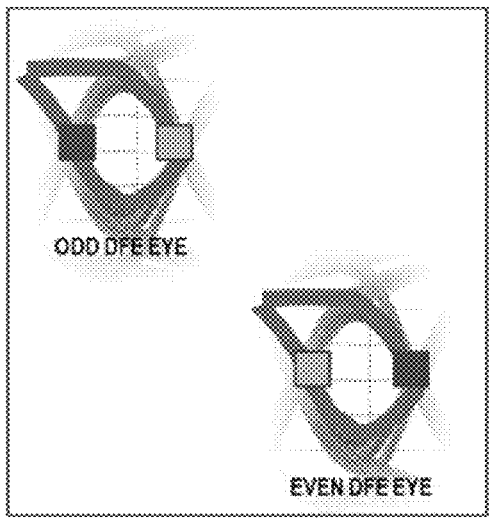
Figure 6D:
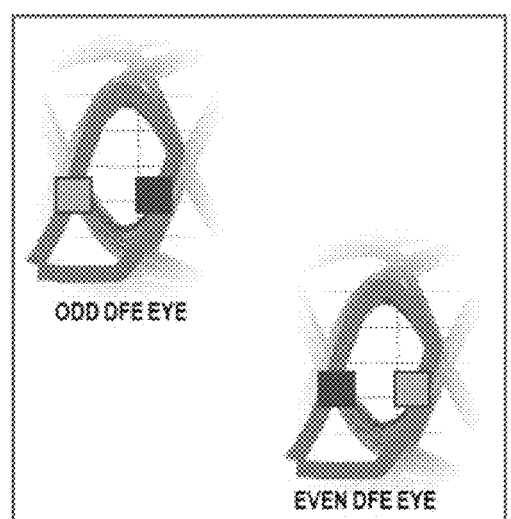

Turning to FIGS. 6a-6d a graphical depiction of the previously described coarse and fine eye location determination is shown using the odd and even eye information generated using DFE latch 500 of FIG. 5. In general the odd eye and even eye will mismatch with respect to each other. As a result to obtain the worst case EYE opening, the adaptation process is expanded to adapt to the left and right eye edge on the top, bottom, odd, and even EYE combinations as shown in FIGS. 6a-6d. In doing the coarse determination (i.e., that described in blocks 404-428 and 403-427 of FIGS. 4a and 4b), data processing ping-pongs between odd eye and even eye and from top to bottom as shown in FIG. 6a or from bottom to top as shown in FIG. 6b. In doing the fine determination (i.e., that described in blocks 430-448 and 429-447 of FIGS. 4a and 4b), data processing ping-pongs between odd eye and even eye and from top to top as shown in FIG. 6c or from bottom to bottom as shown in FIG. 6d.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A serial data processing system, the system comprising:
   a first latch operable to repeatedly latch a data input based upon a threshold and a first phase of a clock to yield a first output, wherein repeated sampling and superposition of the data input yields an eye;
   a second latch operable to repeatedly latch the data input based upon the threshold and a second phase of the clock to yield a second output; and
   a control circuit operable to:
      compare corresponding instances of the first output and the second output to yield an error value;
      detect a transition of the second output corresponding to an edge of the eye;
      before the transition of the second output is detected, repeatedly modify the second phase of the clock using a first modification step calculated based at least in part on the error value and a high gain; and
      after the transition of the second output is detected, modify the second phase of the clock using a second modification step calculated based at least in part on the error value and a reduced gain.

2. The system of claim 1, wherein the control circuit is further operable to:
   detect one of a group of predefined patterns in the second output; and
   wherein modifying the second phase of the clock is only done upon detection of one of a group of predefined patterns in the second output.

3. The system of claim 2, wherein the one of the group of predefined patterns has at least three bits corresponding to symbols in the data input.

4. The system of claim 3, wherein the group of predefined patterns includes: '11101' and '00010'.

5. The system of claim 3, wherein the group of predefined patterns includes: '00110' and '11001'.

6. The system of claim 1, wherein the threshold is variable.

7. The system of claim 6, wherein the control circuit is further operable to:
   modify the first phase of the clock based at least in part on the second phase of the clock to yield a modified first phase;
   repeatedly sample the data input at the modified first phase to yield a maximum voltage and a minimum voltage; and
   modify the threshold based upon a combination of the maximum voltage and the minimum voltage.

8. The system of claim 1, wherein the serial data processing system is implemented as part of a serial data receiver.

9. The system of claim 8, wherein the serial receiver is implemented as part of an integrated circuit.

10. The system of claim 1, wherein detecting a transition of the second output corresponding to the edge of the eye is done using the difference between an odd eye and an even eye output of the second latch.

11. A serial data processing system, the system comprising:
   a first latch operable to repeatedly latch a data input based upon a threshold and a first phase of a clock to yield a first output, wherein repeated sampling of the data input yields an eye;
   a second latch operable to repeatedly latch the data input based upon the threshold and a second phase of the clock to yield a second output; and
   a control circuit operable to:
      compare corresponding instances of the first output and the second output to yield an error value;
      detect one of a group of first transition patterns in the second output corresponding to an edge of the eye, wherein the first transition pattern is a two bit pattern;

before detection of the one of the group of the first transition patterns, repeatedly modify the second phase of the clock using a first modification step calculated based at least in part on the error value;

detect one of a group of second transition patterns in the second output corresponding to an edge of the eye, wherein the second transition pattern is at least a three bit pattern; and after detection of the one of the group of the first transition patterns, modify the second phase of the clock using a second modification step calculated only upon detection of one of the group of second transition patterns.

12. The system of claim 11, wherein the first modification step is calculated based at least in part on a high gain value.

13. The system of claim 12, wherein the second modification step is calculated based at least in part on a reduced gain value.

14. The system of claim 11, wherein the group of first transition patterns includes: '10' and '01'.

15. The system of claim 11, wherein the group of second transition patterns includes: '11101' and '00010'.

16. The system of claim 13, wherein the group of second transition patterns includes: '001100' and '11001'.

17. The system of claim 11, wherein the threshold is variable.

18. The system of claim 17, wherein the control circuit is further operable to:

modify the first phase of the clock based at least in part on the second phase of the clock to yield a modified first phase;

repeatedly sample the data input at the modified first phase to yield a maximum voltage and a minimum voltage; and modify the threshold based upon a combination of the maximum voltage and the minimum voltage.

19. The system of claim 11, wherein the serial data processing system is implemented as part of a serial data receiver, and wherein the serial receiver is implemented as part of an integrated circuit.

20. A method for serial data processing, the method comprising:

receiving a data input that when repeated sampled yields an eye;

using a first latch to repeatedly latch the data input based upon a threshold and a first phase of a clock to yield a first output;

using a second latch to repeatedly latch the data input based upon the threshold and a second phase of the clock to yield a second output;

comparing corresponding instances of the first output and the second output to yield an error value;

detecting a transition of the second output corresponding to an edge of the eye;

before the transition of the second output is detected, repeatedly modifying the second phase of the clock using a first modification step calculated based at least in part on the error value and a high gain; and after the transition of the second output is detected, modifying the second phase of the clock using a second modification step calculated based at least in part on the error value and a reduced gain.

21. A method for serial data processing, the method comprising:

receiving a data input that when repeated sampled yields an eye;

using a first latch to repeatedly latch the data input based upon a threshold and a first phase of a clock to yield a first output;

using a second latch to repeatedly latch the data input based upon the threshold and a second phase of the clock to yield a second output;

comparing corresponding instances of the first output and the second output to yield an error value;

detecting one of a group of first transition patterns in the second output corresponding to an edge of the eye, wherein the first transition pattern is a two bit pattern;

before detection of the one of the group of the first transition patterns, repeatedly modifying the second phase of the clock using a first modification step calculated based at least in part on the error value;

detecting one of a group of second transition patterns in the second output corresponding to an edge of the eye, wherein the second transition pattern is at least a three bit pattern; and after detection of the one of the group of the first transition patterns, modifying the second phase of the clock using a second modification step calculated only upon detection of one of the group of second transition patterns.

* * * * *